United States Patent [19]

Yamanouchi

[11] Patent Number: 5,719,710
[45] Date of Patent: Feb. 17, 1998

[54] OPTICAL APPARATUS

[75] Inventor: Haruhiko Yamanouchi, Kanagawa-ken, Japan

[73] Assignee: Canon Kabushiki Kaisha

[21] Appl. No.: 654,774

[22] Filed: May 29, 1996

Related U.S. Application Data

[63] Continuation of Ser. No. 95,399, Jul. 21, 1993, abandoned.

[30] Foreign Application Priority Data

Jul. 24, 1992 [JP] Japan .................. 4-218167

[51] Int. Cl.⁶ .................................................. G02B 15/14
[52] U.S. Cl. ............................................................. 359/694
[58] Field of Search .................................. 359/694, 699, 359/700, 701, 823

[56] References Cited

U.S. PATENT DOCUMENTS 4,806,000 2/1989 Shiokama et al. ................. 359/706
4,925,282 5/1990 Kanno et al. ...................... 359/698
5,305,036 4/1994 Tanaka .............................. 359/700
5,418,650 5/1995 Imanari ............................. 359/823

FOREIGN PATENT DOCUMENTS 60-40004 9/1985 Japan .

*Primary Examiner*—Scott J. Sugarman
*Attorney, Agent, or Firm*—Robin, Blecker, Daley and Driscoll

[57] ABSTRACT

An optical apparatus is provided with a main operation member arranged to permit both a rectilinear operation and a rotational operation, a subordinate operation member arranged to be operated to vary an operating force required for operating the main operation member to a greater extent for the rectilinear operation than for the rotational operation, a first optical adjustment mechanism arranged to perform a first optical adjusting action in association with the rectilinear operation of the main operation member, and a second optical adjustment mechanism arranged to perform a second optical adjusting action in association with the rotational operation of the main operation member.

17 Claims, 14 Drawing Sheets

(TELEPHOTO END STATE)

FIG. 2 (WIDE-ANGLE END STATE)

FRONT OF LENS

OPTICAL APPARATUS

This is a continuation application under 37 CFR 1.62 of prior application Ser. No. 08/095,399, filed Jul. 21, 1993 abandoned.

BACKGROUND OF THE INVENTION

1. Field of the Invention

This invention relates to an optical apparatus arranged to permit both a rotational operation and a rectilinear operation with one operation member.

2. Description of the Related Art

Optical apparatuses of the kind having a relatively heavy weight imposed on an operation member have heretofore been arranged as follows:

(i) A rectilinear operating force required for operating the operation member is set at a large value for the purpose of preventing the operation member from slipping down even in cases where the optical axis of the optical apparatus is in the direction of gravity.

(ii) In the case of a macro lens or the like, the lens is to be rotationally operated by a helicoid arrangement or the like, by omitting the rectilinear operation of the operation member.

However, with the rectilinear operating force required for operating the operation member set at the large value as mentioned in Para. (i) above, a larger operating force is necessary in operating the optical apparatus in a horizontal posture. Further, the helicoid arrangement mentioned in Para. (ii) makes the operation troublesome in cases where the operation member must be drawn out to a great extent.

Any excessively poor operability necessitating a correction of an operating force has seldom been noted among optical apparatuses such as lens barrels. However, some zoom lens barrels of today consist of many lens groups, which are required to make complex movements within the lens barrels. Therefore, it has become desirable for a zoom lens barrel of this type to have the operating force to be finely adjustable so as to eliminate the fluctuations of the operating force.

Further, in a case where it is preferable to have the telephoto lens or the like focused slowly on an object located at a far distance and focused quickly on an object located at a near distance, it is also desirous to finely adjust the operating force by increasing the operating force for the far distance.

SUMMARY OF THE INVENTION

It is one aspect of this invention to provide an optical apparatus having a main operation member arranged to permit a rectilinear operation for giving a first adjusting action and a rotational operation for giving a second adjusting action and a subordinate operation member arranged to vary an operating force required for the rectilinear operation on the main operation member.

The above and other aspects and features of this invention will become apparent from the following detailed description of embodiments thereof taken in connection with the accompanying drawings.

DETAILED DESCRIPTION OF THE PREFERRED EMBODIMENTS

Figure 1:
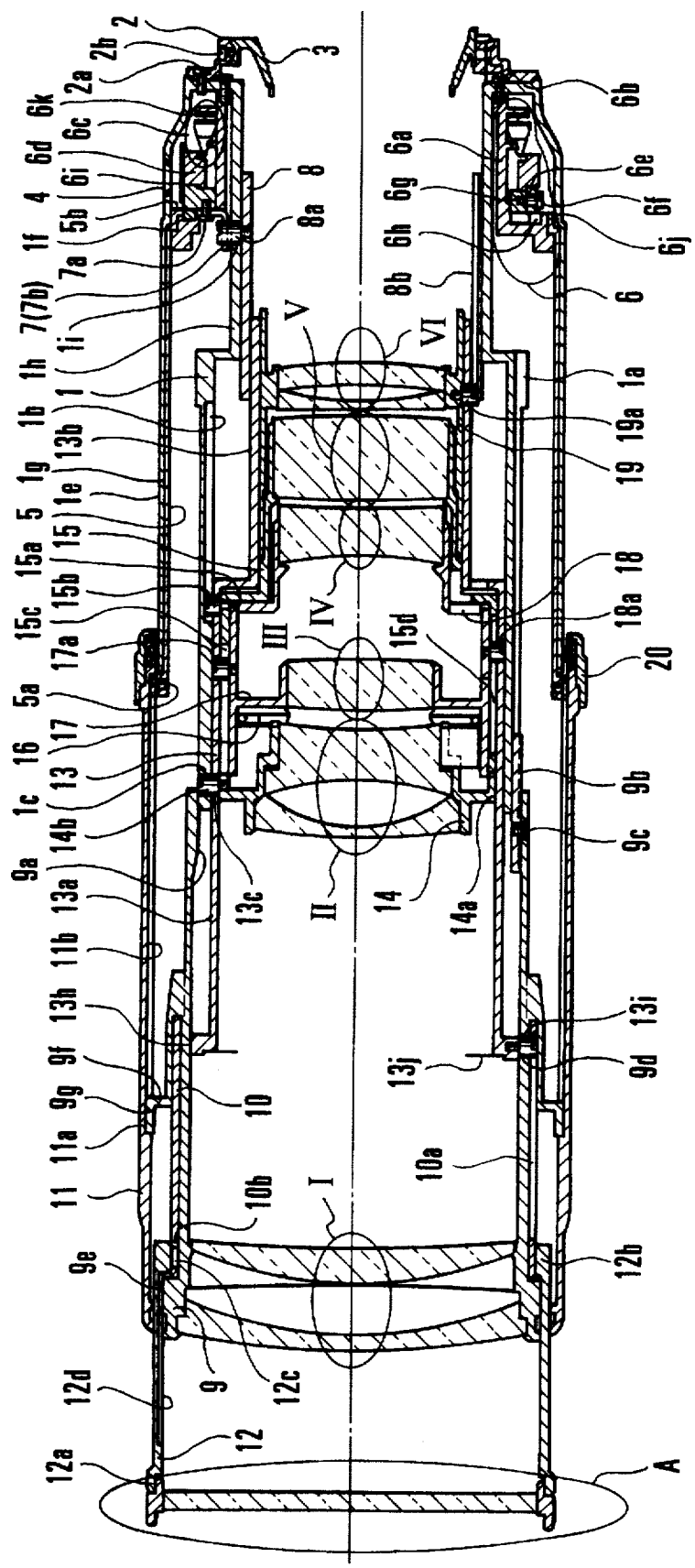
FIG. 1 is a sectional view showing the telephoto end state of a lens barrel which is arranged according to this invention as a first embodiment thereof.
Figure 2:
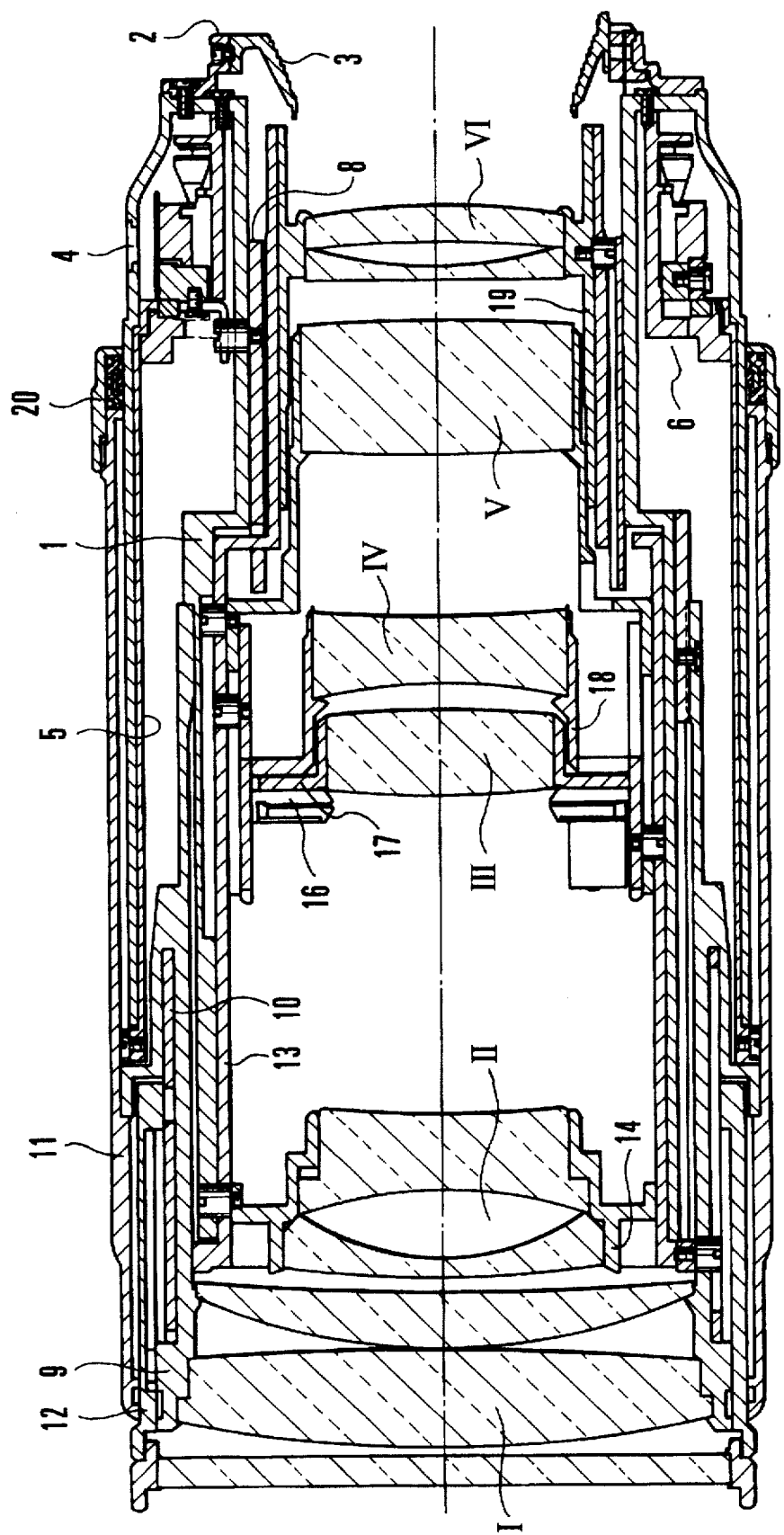
FIG. 2 is a sectional view showing the wide-angle end state of the lens barrel which is arranged as the first embodiment of this invention.
Figure 3:
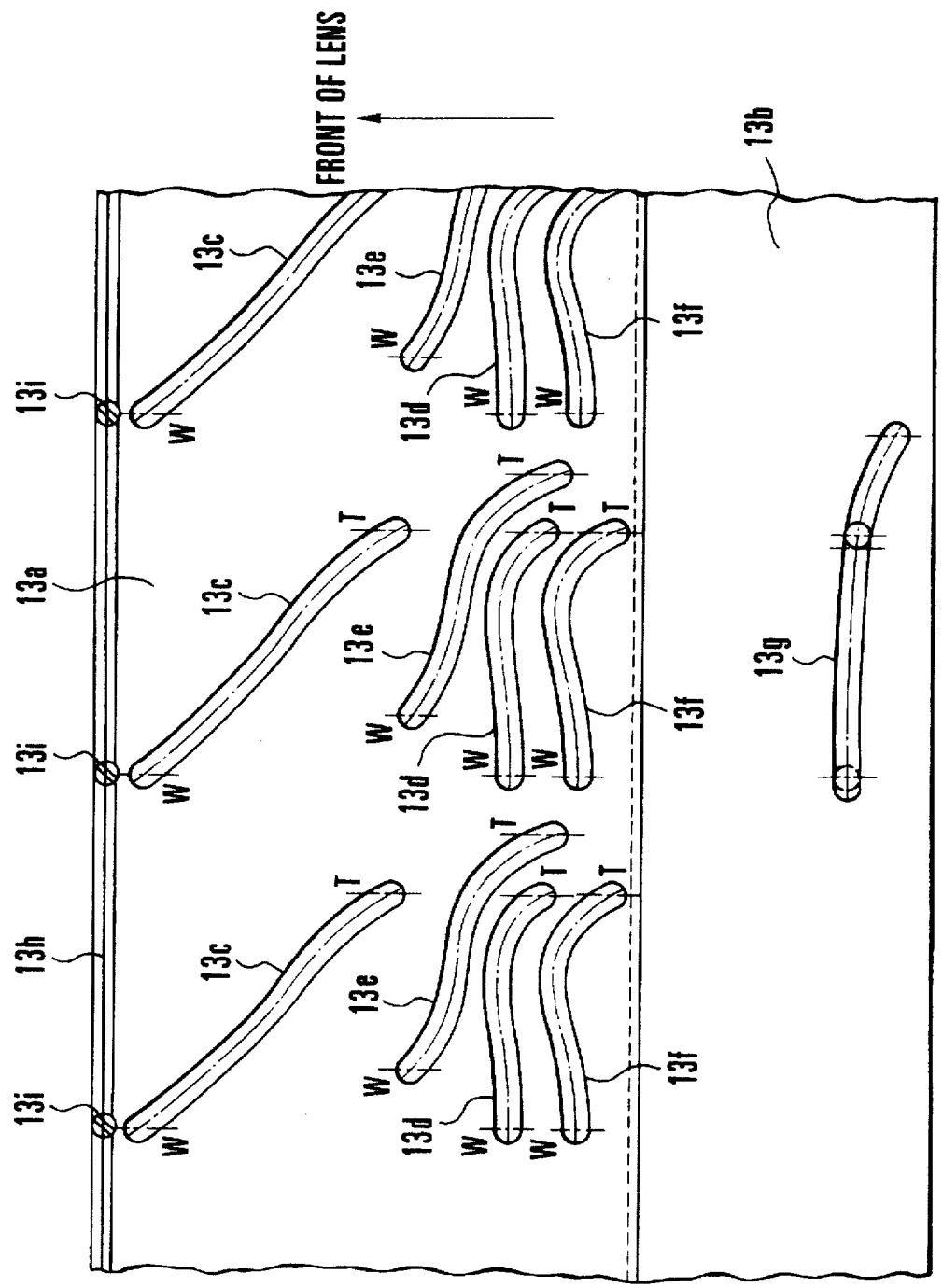
FIG. 3 is a development view showing a cam tube included in the lens barrel of the first embodiment.
Figure 4:
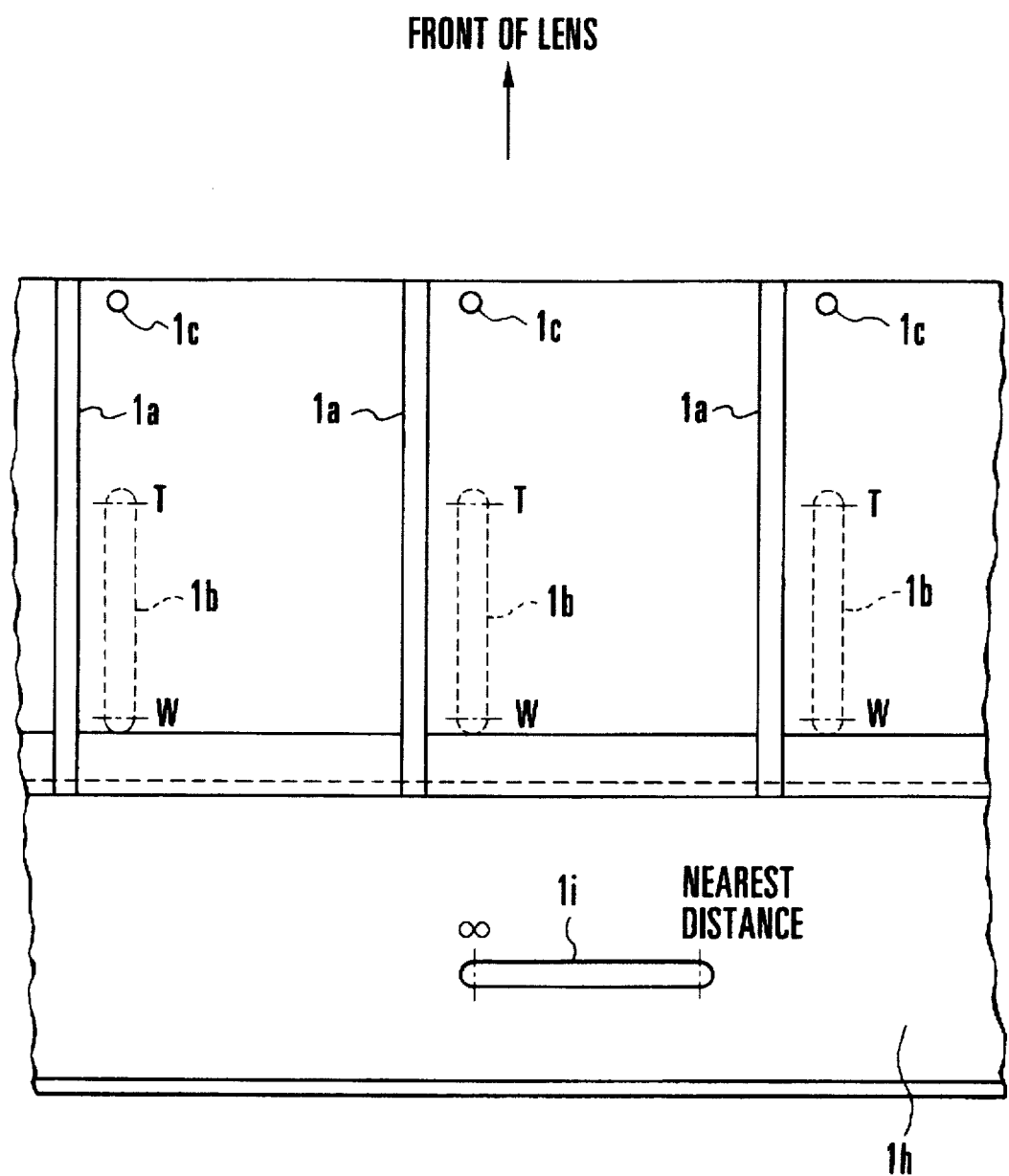
FIG. 4 is a development view showing a fixed tube included in the lens barrel of the first embodiment.
Figure 5:
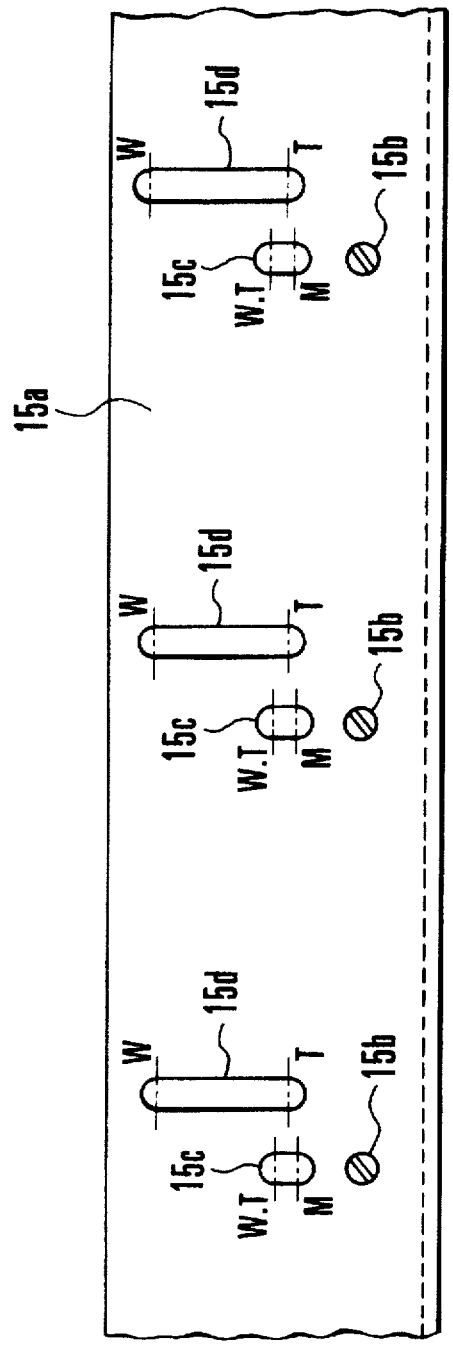
FIG. 5 is a development view showing a fitting engagement part of a fifth-lens-group tube included in the lens barrel of the first embodiment.
Figure 6:
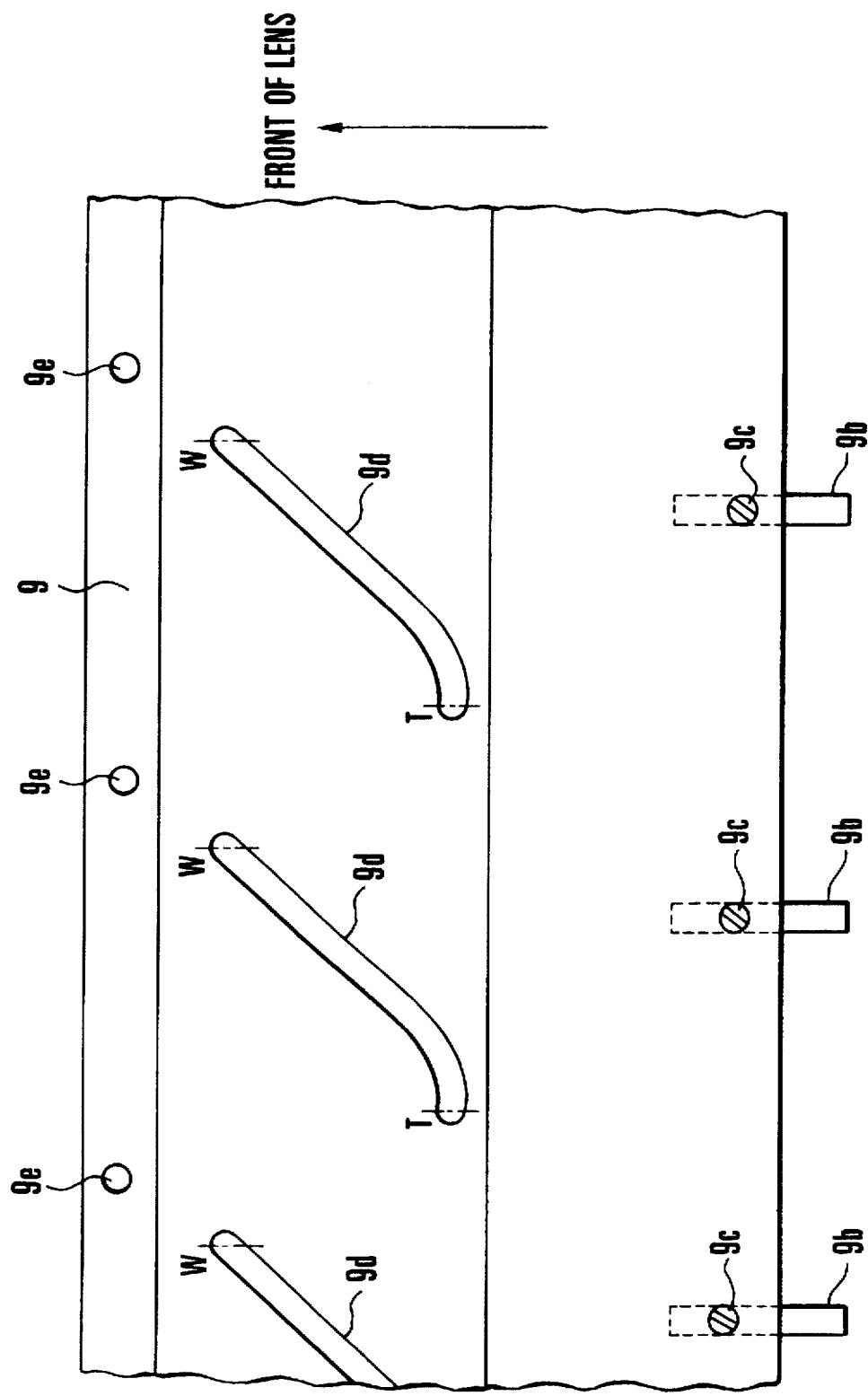
FIG. 6 is a development view showing a first-lens-group tube included in the lens barrel of the first embodiment.
Figure 7:
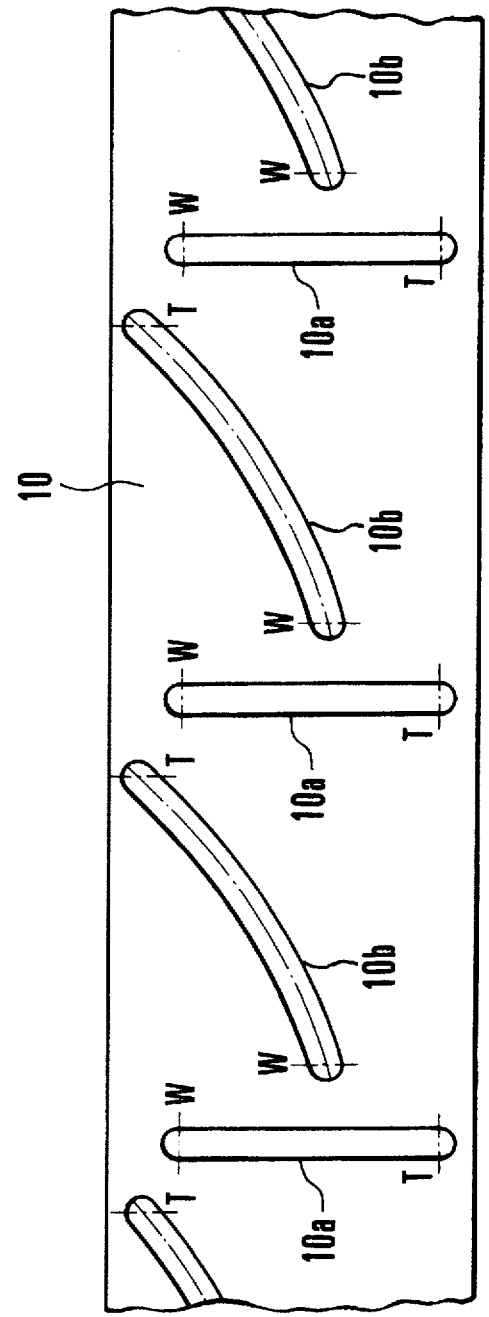
FIG. 7 is a development view showing a cam tube for a hood included in the lens barrel of the first embodiment.
Figure 8:
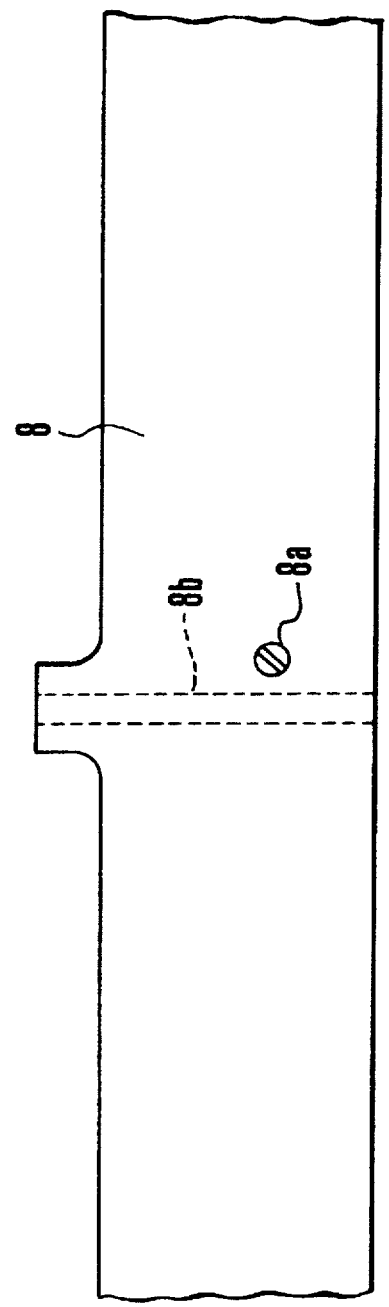
FIG. 8 is a development view showing a focus interlocking tube included in the lens barrel of the first embodiment.
Figure 9:
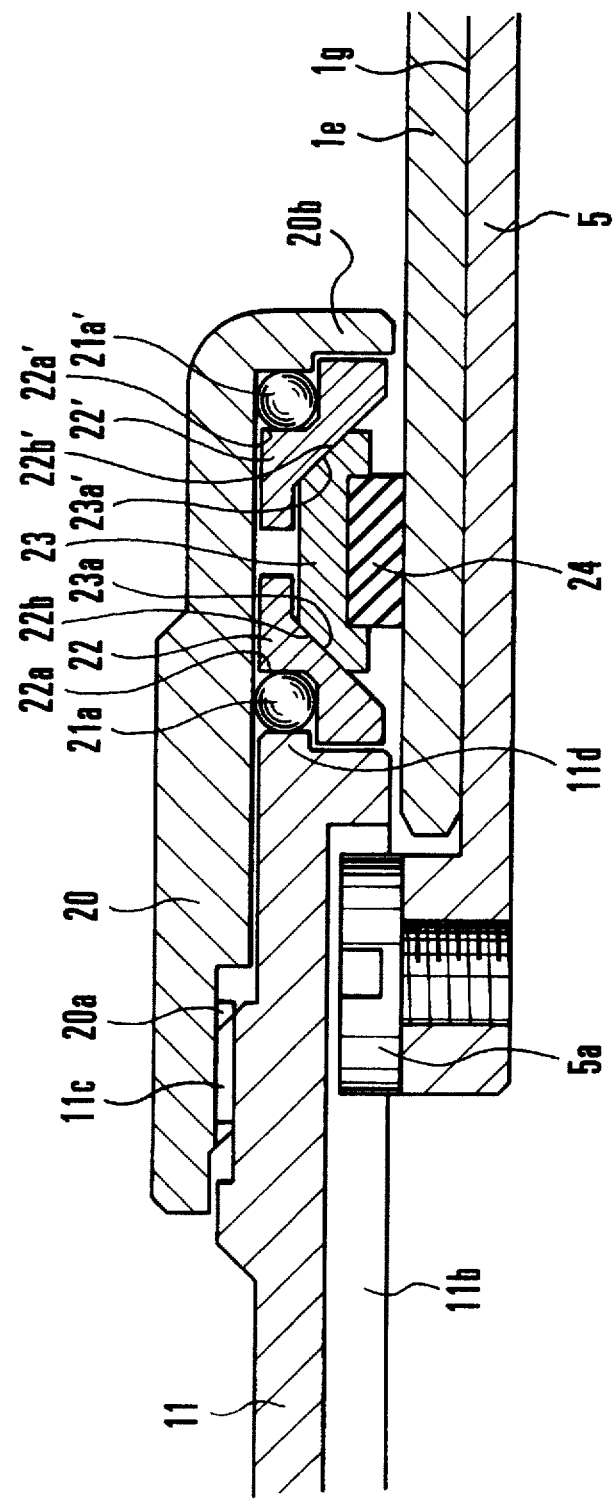
FIG. 9 is a detailed view showing the arrangement of an operating force adjustment mechanism included in the lens barrel of the first embodiment.
Figure 10:
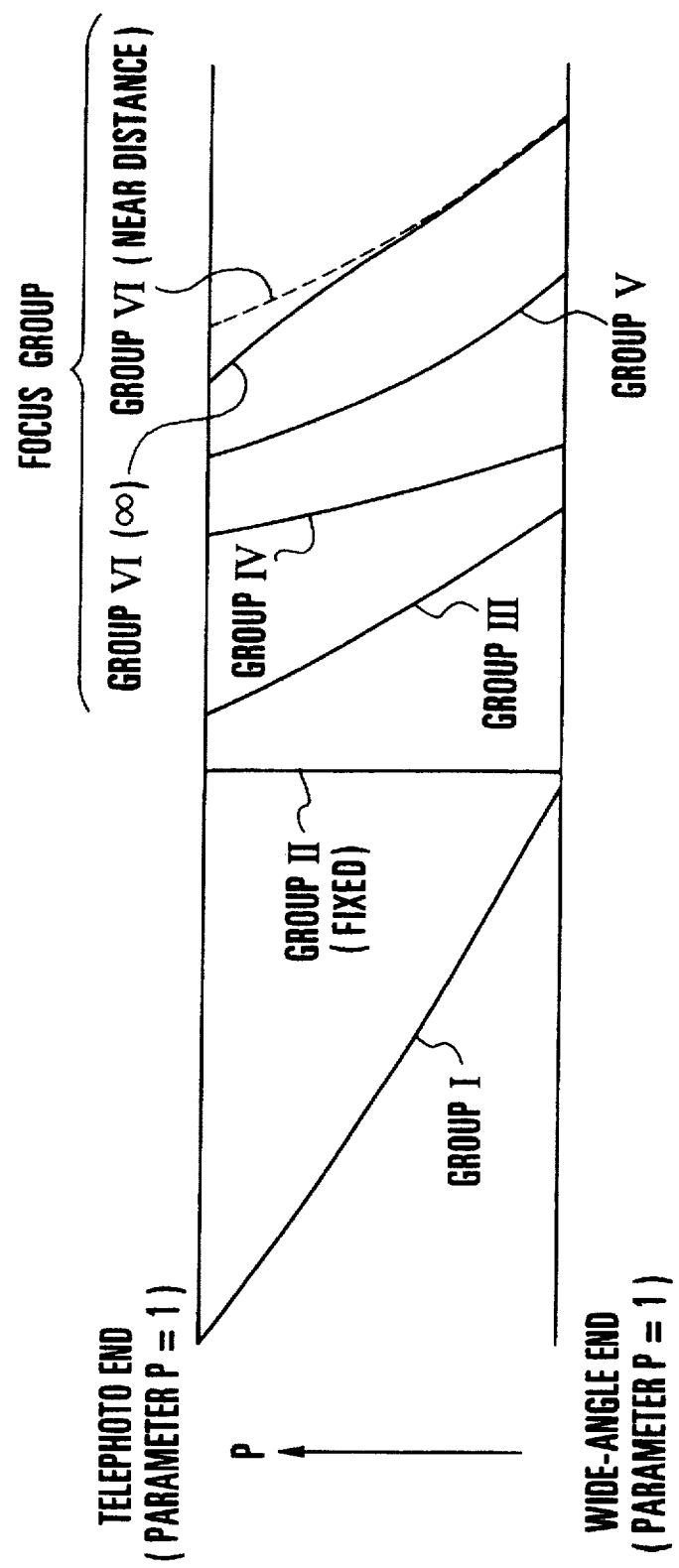
FIG. 10 is a diagram showing a zooming movement of each lens group included in the lens barrel of the first embodiment.

A first embodiment of this invention is arranged as shown in FIGS. 1 to 10. FIG. 1 is a sectional view showing a telephoto end state of a lens barrel which is arranged as the first embodiment. FIG. 2 is a sectional view showing a wide-angle end state of the same lens barrel. FIG. 3 is a development view of a cam tube. FIG. 4 is a development view of a fixed tube. FIG. 5 is a development view of a fitting engagement part of a fifth-lens-group tube. FIG. 6 is a development view of a first-lens-group tube. FIG. 7 is a development view of a cam tube for a hood. FIG. 8 is a development view of a focus interlocking tube. FIG. 9 is a detailed view of an operating force adjustment mechanism. FIG. 10 is a diagram showing the zooming movement of each lens group.

Referring to FIGS. 1 to 10, the lens barrel includes a first lens group I, a second lens group II, a third lens group III, a fourth lens group IV, a fifth lens group V and a sixth lens group VI. In FIG. 1, reference symbol A denotes a filter which is detachably attached to the lens barrel.

In these figures, reference numeral 1 denotes a fixed tube. As shown in FIG. 4, the fixed tube 1 has three outer rectilinear grooves 1a, three inner rectilinear grooves 1b and three second-lens-group holding holes 1c. These three grooves or holes are equally spaced. A small diameter part 1h of the fixed tube 1 has a circumferential hole 1i.

Reference numeral 2 denotes a mount. The mount 2 is secured to the fixed tube 1 with screws 2a and is arranged to hold a back cover 3. A stopper pin 2b for mounting and demounting is provided on the mount 2.

The fixed tube 1 has a large diameter part 1e. The large diameter part 1e has a distance window part 4. A stepped part 1f and a fitting engagement part 1g are formed inside the peripheral part of the large diameter part 1e. A rotary tube 5 is rotatably carried by the stepped part 1f and the fitting engagement part 1g.

Pins 5a are screwed into the fore end of the rotary tube 5 from outside at two opposite points. Three protruding parts 5b protrude toward a rear end inner circumferential part of the rotary tube 5. Reference numeral 6 denotes a focusing unit. A body 6a of the focusing unit 6 is secured to the fixed tube 1 with screws 6b. Reference numeral 6c denotes a known ultrasonic motor.

Reference numeral 6d denotes an output member. Roller members 6e are rotatably carried by shaft screws 6f at three evenly spaced parts of the outer circumference of a roller ring 6g. The roller ring 6g is fitted into the body 6a of the focusing unit 6 on its inner diameter side in such a way as to be rotatably carried by the body 6a of the focusing unit 6. A distance graduation 6i is provided along the outer circumference of the roller ring 6g.

An intermediate member 6h is fitted in and held by the body 6a of the focusing unit 6. The intermediate member 6h has three fitting longitudinal groove parts 6j on its outer circumferential side and is arranged to be rotatable together with the above-stated rotary tube 5 with the protruding parts 5b which are formed on the rear end inner circumferential part of the rotary tube 5 fitted into the fitting longitudinal groove parts 6j.

A pressing member 6k which is provided for pressing the ultrasonic motor 6c is arranged within the body 6a of the focusing unit 6 to press the ultrasonic motor 6c, the output member 6d, the roller member 6e and the intermediate member 6h in turn at the same time.

A focus key 7 is secured with a screw 7a to the roller ring 6g within the focusing unit 6. The focus key 7 has a fitting longitudinal groove part 7b. A focus interlocking tube 8 is fitted into the fixed tube 1 and, as shown in FIG. 8, is provided with a longitudinal groove 8b formed in its inner circumferential face. A pin 8a is screwed into the outer circumferential face of the focus interlocking tube 8 and is arranged to have its thrust restricted by the circumferential hole 1i of the small diameter part 1h of the fixed tube 1 and to have its rotation restricted by the fitting longitudinal groove part 7b of the above-stated focus key 7.

A first lens group tube 9 is arranged to carry the first lens group I and to fittingly engage the fixed tube 1 at its fitting engagement part 9a which is located at the rear end inner part of the first-lens-group tube 9. Three rectilinear keys 9b are secured to the rear end inner part of the first-lens-group tube 9 with screws 9c as shown in FIG. 6. The first-lens-group tube 9 is carried in such a way as to be rectilinearly movable relative to the fixed tube 1 with the three rectilinear keys 9b respectively fitted into the three rectilinear grooves 1a formed in the outer side of the fixed tube 1.

Three cam slots 9d are formed and evenly spaced in the front half part of the first-lens-group tube 9. A peripheral fitting part of the first-lens-group tube 9 fittingly engages and carries a cam tube 10 which is provided for a hood. The first-lens-group tube 9 is thus arranged to carry the cam tube 10 for the hood in such a way as to allow the cam tube 10 to rotate in a set position relative to the first-lens-group tube 9 by restricting the thrust of the cam tube 10.

Three dowels 9e are evenly spaced and disposed on the front peripheral part of the first-lens-group tube 9. A flange part 9f extends from the first-lens-group tube 9 toward its outer circumferential side. The flange part 9f has a fitting engagement part 9g which is formed in the peripheral part of the flange part 9f.

As shown in FIG. 7, the cam tube 10 for the hood is provided with three rectilinear slots 10a and three cam slots 10b which are evenly spaced.

An operation ring 11 has a fitting engagement receiving part 11a which is formed in the middle part on the inner side of the operation ring 11. The fitting engagement receiving part 11a is arranged to fittingly engage the fitting engagement part 9g of the flange part 9f extending toward the outer circumferential side of the first-lens-group tube 9 and to restrict the thrust of the first-lens-group tube 9. The first-lens-group tube 9 thus can be moved back and forth by the operation ring 11.

Further, longitudinal grooves 11b are formed in two opposite parts on the inner side of the operation ring 11. The two longitudinal grooves 11b fittingly engage two pins 5a which are screwed from outside into the fore end of the rotary tube 5. By virtue of this fitting engagement, the operating force of the operation ring 11 can be always stably transmitted through the rotary tube 5 to the intermediate member 6h included in the focusing unit 6 even when the operation ring 11 is moved back and forth by a rotational operation performed on the operation ring 11.

A filter frame 12 is provided with a filter thread 12a in its fore end inner circumferential part for screwing a filter A into the filter frame 12. The filter frame 12 is provided further with a fitting engagement part 12b in its rear end inner circumferential part. The fitting engagement part 12b has three dowels 12c evenly spaced on the inner side thereof.

Three longitudinal grooves 12d are formed in three evenly spaced intermediate parts on the inner side of the filter frame 12. The position of the filter frame 12 is restricted with the longitudinal grooves 12d fitted on the dowels 9e provided on the front peripheral part of the first-lens-group tube 9. A fitting engagement part 12b which is located in the rear end inner circumferential part of the filter frame 12 is fitted on the periphery of the cam tube 10 for the hood. In addition to that, the three dowels 12c which are on the inner side of the fitting engagement part 12b in the rear end inner circumferential part of the filter frame 12 are fitted in the cam slots 10b of the cam tube 10 for the hood. Therefore, when the cam tube 10 for the hood is rotated, the filter frame 12 is rectilinearly drawn out relative to the first lens group I which is carried by the first-lens-group tube 9.

As shown in FIG. 3, a cam tube 13 has a large diameter part 13a. The large diameter part 13a is fitted into the inner side of the fixed tube 1 and is carried by the fixed tube 1. Further, as shown in FIG. 3, the large diameter part 13a is provided with three fixed-pin cams 13c, three third-lens-group cams 13d, three fourth-lens-group cams 13e and three fifth-lens-group cams 13f. The three cams of each of the cam groups are evenly spaced.

A small diameter part 13b of the cam tube 13 is provided with a focus cam 13g. The diameter of the cam tube 13 is increased by one step for its front end peripheral part. A fitting engagement part 13h is arranged at the front end peripheral part of the cam tube 13 to have fitting engagement pins 13i screwed into three parts which are evenly spaced.

The fitting engagement pins 13i engage the cam slots 9d of the first-lens-group tube 9 by piercing them and, at the same time, engage the rectilinear slots 10a of the cam tube 10 for the hood. Therefore, the amount of rotation of the cam tube 13 restricts the amount of rotation of the cam tube 10 for the hood and thus determines the drawn out amount of the filter frame 12.

A second-lens-group tube 14 carries the second lens group II and has a fitting engagement part 14a on its periphery. The fitting engagement part 14a has three fixed pins 14b which are evenly spaced.

The three fixed pins 14b on the fitting engagement part 14a respectively engage three fixed-pin cams 13c which are formed in the large diameter part 13a of the cam tube 13 and, at the same time, also engage the second-lens-group holding holes 1c provided in the fixed tube 1. The second-lens-group tube 14 is, therefore, stationary relative to the fixed tube 1.

The rotating position and the thrust (rectilinear) position of the cam tube 13 are determined by two position determining factors including the shapes of the fixed-pin cams 13c formed in the large diameter part 13a of the cam tube 13 and the shapes of the cam slots 9d formed in the front half of the first-lens-group tube 9. The cam tube 13 can be drawn out, with a rotational motion, from its wide-angle end state (position) shown in FIG. 2 to its telephoto end state shown in FIG. 1 by moving the operation ring 11 forward.

A moving diaphragm 13j is secured to the fore end face of the cam tube 13. A fifth-lens-group tube 15 carries the fifth lens group V and has a fitting engagement part 15a. The fifth-lens-group tube 15 is thus arranged to be carried by the cam tube 13 with the fitting engagement part 15a engaging the large diameter part 13a of the cam tube 13. Further, as shown in FIG. 5, the fifth-lens-group tube 15 is provided with three fifth-lens-group pins 15b which are screwed into the fitting engagement part 15a, three third-lens-group slots 15c and three fourth-lens-group slots 15d, which are evenly spaced. Since the fifth-lens-group pins 15b which are screwed into the fitting engagement part 15a are engaging the fifth-lens-group cams 13f formed in the large diameter part 13a of the cam tube 13 and are also engaging, at the same time, the rectilinear grooves 1b provided in the inner face of the fixed tube 1, the fifth-lens-group tube 15 is movable for zooming as desired by the rotational drawing-out action of the cam tube 13.

Reference numeral 16 denotes a known electromagnetic diaphragm unit.

A third-lens-group tube 17 carries the third lens group III and the electromagnetic diaphragm unit 16. The third-lens-group tube 17 fittingly engages the fifth-lens-group tube 15 to be carried thereby. Third-lens-group pins 17a which are screwed into the fitting engagement face of the third-lens-group tube 17 engage the third-lens-group slots 15c provided in the fitting engagement part 15a of the fifth-lens-group tube 15 and also engage third-lens-group cams 13d formed in the large diameter part 13a of the cam tube 13. This arrangement permits zooming to be carried out as desired by rectilinearly moving the third-lens-group tube 17 through the rotational drawing-out action of the cam tube 13.

A fourth-lens-group tube 18 carries the fourth lens group IV and fittingly engages the fifth-lens-group tube 15 to be carried thereby. Fourth-lens-group pins 18a are screwed into the fitting engagement face of the fourth-lens-group tube 18. The fourth-lens-group pins 18a engage the fourth-lens-group slots 15d which are formed in the fitting engagement part 15a of the fifth-lens-group tube 15 and, at the same time, also engage the fourth-lens-group cams 13e which are formed in the large diameter part 13a of the cam tube 13. Therefore, the fourth-lens-group tube 18 is movable at the same time as the third-lens-group tube 17 for zooming as desired by the rotational drawing-out action of the cam tube 13.

A sixth-lens-group tube 19 carries the sixth lens group VI and fittingly engages the inner face of the small diameter part 13b of the cam tube 13 to be carried thereby. A sixth-lens-group pin 19a is screwed into the fitting engagement part of the sixth-lens-group tube 19. The sixth-lens-group pin 19a engages the focus cam 13g formed in the small diameter part 13b of the cam tube 13 and also engages the longitudinal groove 8b formed in the inner circumferential face of the focus interlocking tube 8 mentioned in the foregoing. The sixth-lens-group tube 19 is thus positioned through the sixth-lens-group pin 19a.

Referring to FIG. 9, a female thread 20a formed in the fore end part of a subordinate operation ring 20 engages a male thread 11c formed in the rear end outer circumferential part of the operation ring 11 which serves as a main operation ring. The subordinate operation ring 20 has an inner flange part 20b at its rear end part. Between the rear end part 11d of the operation ring 11 and the inner flange part 20b of the subordinate operation ring 20, there are provided, in order from the front side of the optical axis, balls 21a, a tapered block 22 which has a pressed contact face 22a for pressed contact with the balls 21a and a conical slanting face 22b, a C band 23 which has a conical slanting face 23a for pressed contact with the conical slanting face 22b, a conical slanting face 23a' located on the rear end side of the C band 23, an elastic sliding member 24 applied to the inner diameter side of the C band 23 and a cutout part in the direction of circumference, a tapered block 22' which has a conical slanting face 22b' for pressed contact with the conical slanting face 23a' of the C band 23 and a pressed contact face 22a', and balls 21a' arranged to be in pressed contact with the pressed contact face 22a' of the tapered block 22'. When the subordinate operation ring 20 is screwed into the operation ring 11, pressure is applied simultaneously to these parts in the direction of the optical axis.

As apparent from the arrangement shown in FIG. 9, the C band 23 which has the front and rear conical slanting faces 23a and 23a' is arranged to be contractive on the inner diameter side. Therefore, the elastic sliding member 24, which is applied to the inner diameter side of the C band 23, tightly pushes the large diameter part 1e of the fixed tube 1. As a result, the operation ring 11 becomes not readily movable relative to the fixed tube 1. An operating force required for a rectilinear operation on the operation ring 11 thus comes to increase. On the other hand, the balls 21a and 21a' act to allow the operation ring 11 to be always rotatable relative to the fixed tube 1. Therefore, an operating force required for a rotational operation on the operation ring 11 does not vary much.

FIG. 10 is a diagram showing the movement of each lens group taking place at the time of zooming. The first lens group I is drawn out in a nonlinear manner. The second lens group II is stationary. The third lens group III to the sixth lens group VI are respectively drawn out in nonlinear manners.

Figure 11:
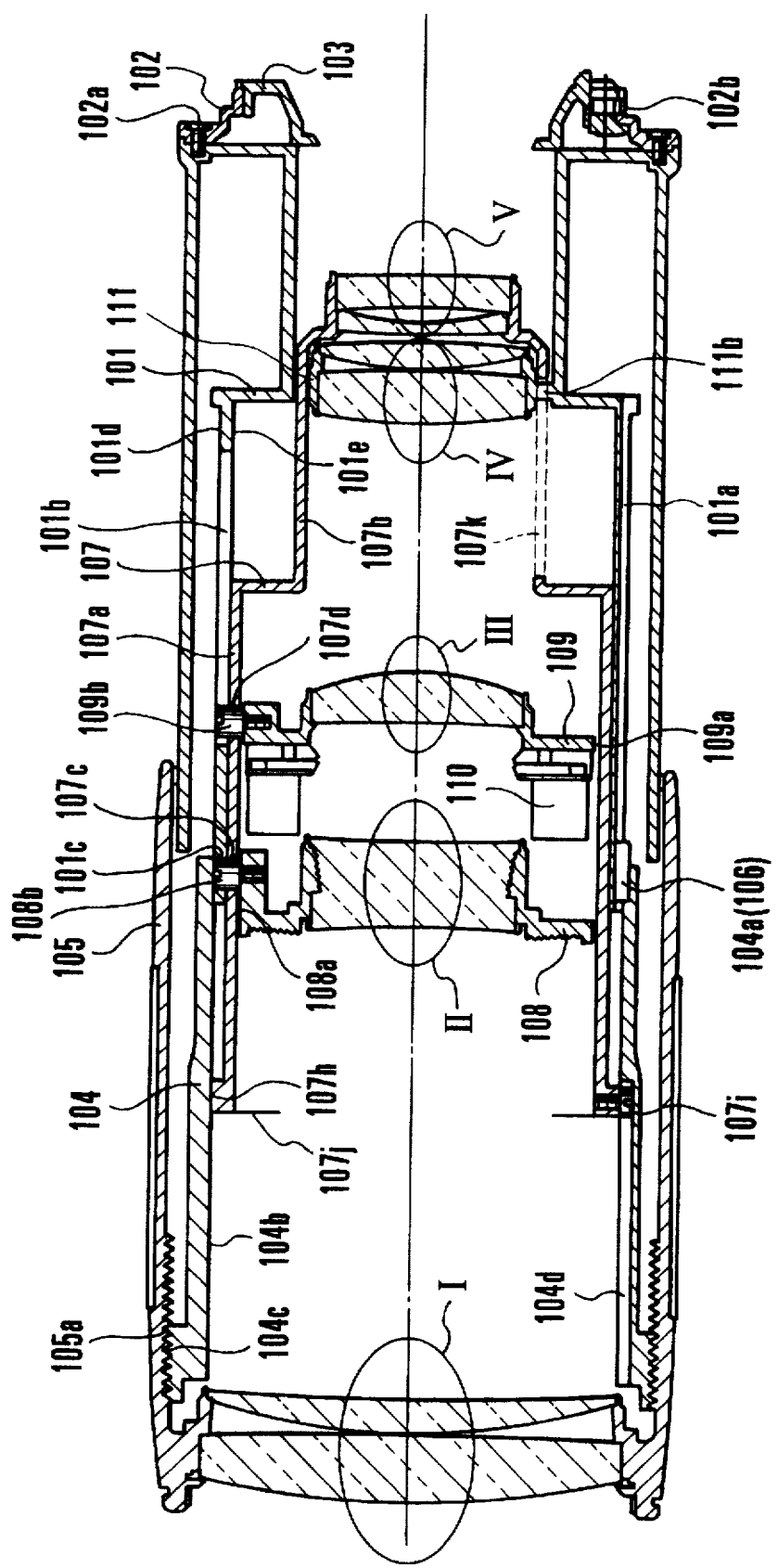
FIG. 11 is a sectional view showing the telephoto end state of a lens barrel arranged according to this invention as a second embodiment thereof.
Figure 12:
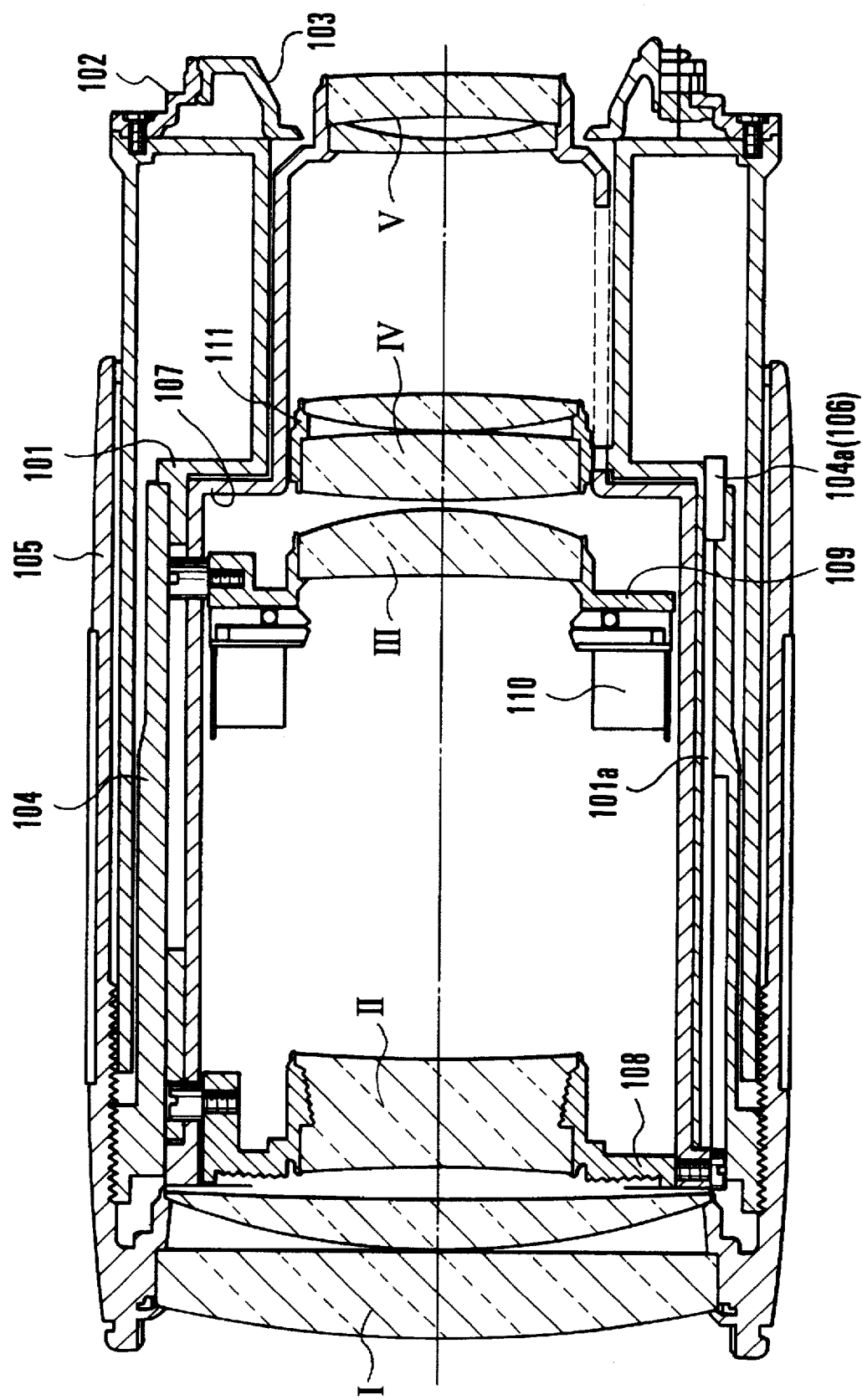
FIG. 12 is a sectional view showing the wide-angle state of the lens barrel of the second embodiment.
Figure 13:
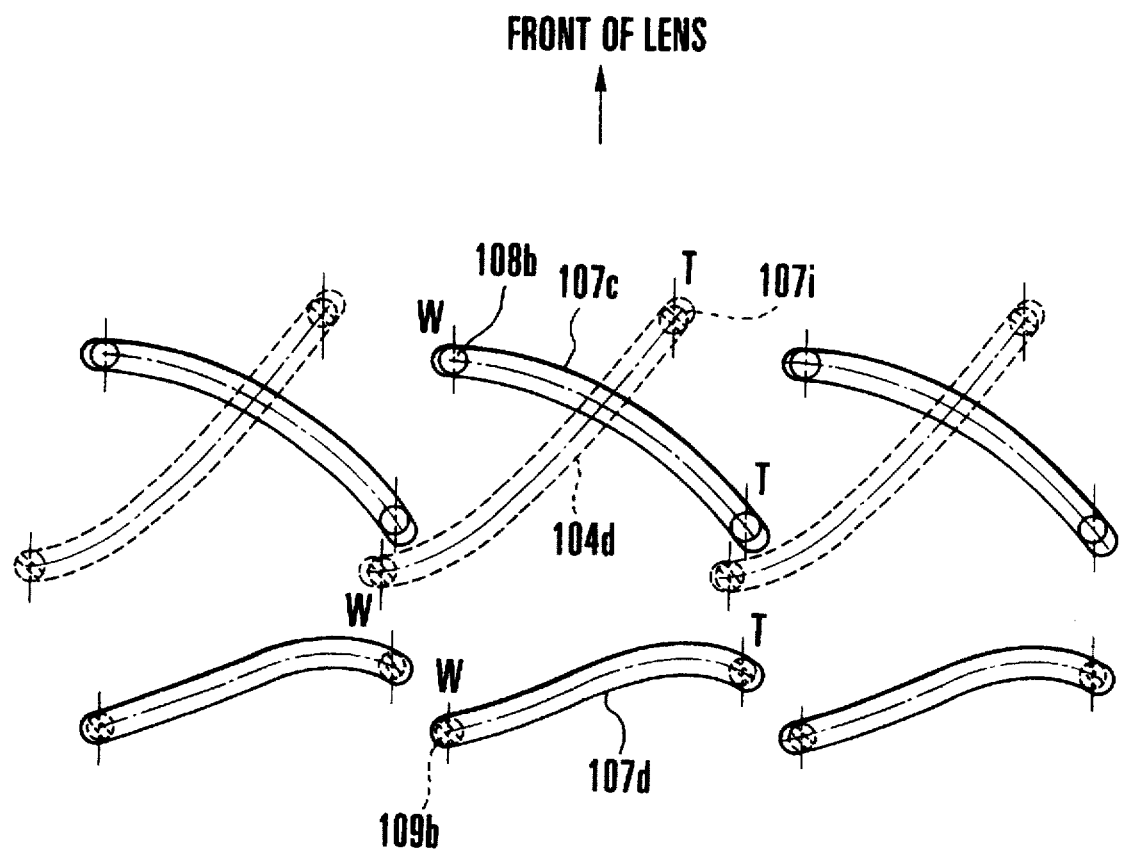
FIG. 13 is a development view showing a cam part included in the lens barrel of the second embodiment.
Figure 14:
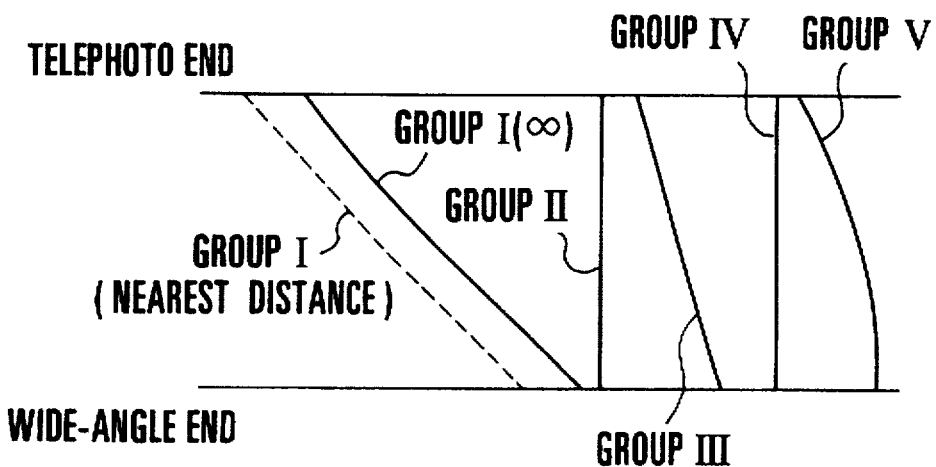
FIG. 14 is a diagram showing the zooming movement of each lens group included in the lens barrel of the second embodiment.
Figure 15:
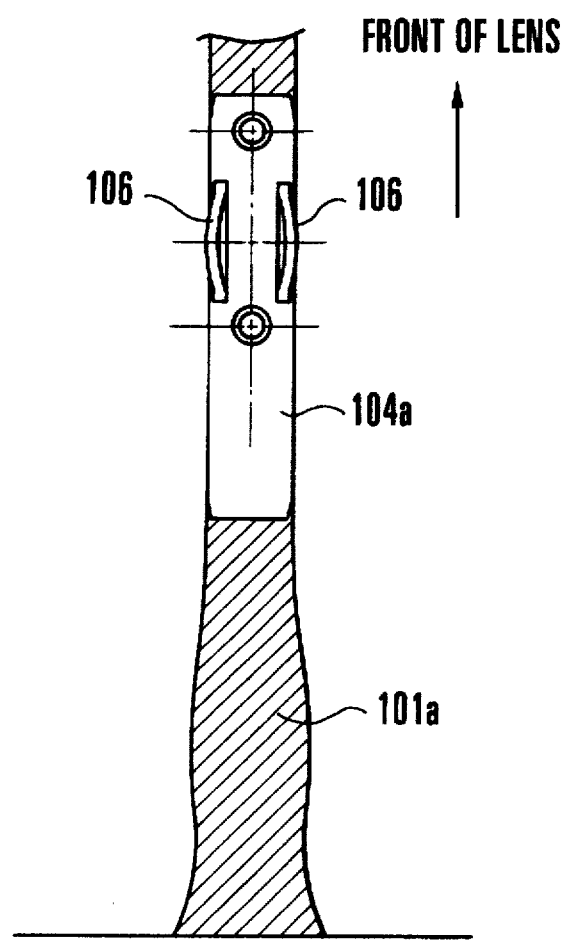
FIG. 15 is an enlarged view showing a key and a spring part included in the lens barrel of the second embodiment.

FIGS. 11 to 15 show a second embodiment of this invention. FIG. 11 is a sectional view showing a lens barrel in a telephoto end state. FIG. 12 is a sectional view showing the lens barrel in a wide-angle end state. FIG. 13 is a development view showing a first-lens-group tube and a cam tube. FIG. 14 is a diagram showing the movement of each lens group taking place at the time of zooming. FIG. 15 is an enlarged view showing a key and a spring part.

In FIGS. 11 to 15, reference numeral I denotes a first lens group. Reference numeral II denotes a second lens group.

Reference numeral III denotes a third lens group. Reference numeral IV denotes a fourth lens group. Reference numeral V denotes a fifth lens group.

Referring to these figures, a fixed tube 101 has three outer rectilinear grooves 101a which are evenly spaced, three rectilinear slots 101b which are evenly spaced and three second-lens-group holding holes 101c which are also evenly spaced. The width of each of the outer rectilinear grooves 101a varies with its position. The fixed tube 101 is provided further with an outer fitting engagement part 101d and an inner fitting engagement part 101e. A mount 102 which is secured to the fixed tube 101 with screws 102a is arranged to carry a back cover 103 and is provided with a stopper pin 102b for mounting and demounting. A first-lens-group tube 104 has three keys 104a which are disposed in a rear end part and are evenly spaced. The first-lens-group tube 104 further has, on its inner side, a fitting engagement part 104b and three cam grooves 104d which are evenly spaced. As shown in FIG. 15, each of the keys 104a fittingly engages the outer rectilinear groove 101a of the fixed tube 101 and, at the same time, has leaf springs 106 fitted therein in such a manner that the pressed contact force of the key 104a varies according to a change of the groove width of the outer rectilinear groove 101a. Therefore, fluctuations in the force of a zooming operation, etc., can be absorbed by suitably setting the groove width of the outer rectilinear grooves 101a of the fixed tube 101. The operating force also can be controlled in such a way as to intentionally change it.

Further, the inner fitting engagement part 104b of the first-lens-group tube 104 fittingly engages the outer fitting engagement part 101d of the fixed tube 101. A mail helicoid 104c is formed in a fore end outer diameter part of the first-lens-group tube 104.

An operation ring 105 carries the first lens group I at its fore end part and is provided with a female helicoid 105a which is formed in its inner face. The female helicoid 105a engages the male helicoid 104c formed in the fore end outer part of the first-lens-group tube 104. The first-lens-group tube 104 thus can be moved back and forth between the telephoto end state as shown in FIG. 11 and the wide-angle end state as shown in FIG. 12 by rotating the operation ring 105.

A cam tube 107 has a large diameter part 107a. The large diameter part 107a fittingly engages an inner diameter part of the fixed tube 101 to be carried thereby. Further, referring to FIG. 13, the large diameter part 107a of the cam tube 107 is provided with three fixed-pin cams 107c and three third-lens-group cams 107d, which are evenly spaced. The small diameter part 107b of the cam tube 107 carries the fifth lens group V.

The diameter of the fore end peripheral part of the cam tube 107 is increased by one step and includes a fitting engagement part 107h, which fittingly engages the fitting engagement part 104b on the inner side of the first-lens-group tube 104. Fitting engagement pins 107i are screwed into the fitting engagement part 107h at three evenly spaced parts. The fitting engagement pins 107i engage the cam grooves 104d of the first-lens-group tube 104. The cam tube 107 further has a cutout part 107k.

A second-lens-group tube 108 carries the second lens group II and has an outer circumferential part 108a. The outer circumferential part 108a has three fixed pins 108b which are evenly spaced. The fixed pins 108b engage the fixed-pin cams 107c formed in the large diameter part 107a of the cam tube 107 and, at the same time, engage also the second-lens-group holding holes 101c formed in the fixed tube 101. Therefore, the second-lens-group tube 108 is stationary relative to the fixed tube 101.

The rotating position and the thrust position of the cam tube 107 are determined by two positional factors including the shape of the fixed-pin cams 107c formed in the large diameter part 107a of the cam tube 107 and the shape of the cam grooves 104d formed in the inner face of the first-lens-group tube 104. With the cam tube 107 arranged as described above and its rotating and thrust positions determined in this manner, the cam tube 107 can be drawn out, with a rotational motion, by moving the operation ring 105 back and forth.

A moving diaphragm 107j is secured to the fore end face of the cam tube 107. A third-lens-group tube 109 carries the third lens group III and has a peripheral part 109a, by which the third-lens-group tube 109 is carried within a void inside space of the large diameter part 107a of the cam tube 107. Third-lens-group pins 109b are screwed into the peripheral part 109a of the third-lens-group tube 109. The third-lens-group pins 109b engage the third-lens-group cams 107d formed in the large diameter part 107a of the cam tube 107 and, at the same time, also engage the rectilinear slots 101b of the fixed tube 101. Therefore, the third-lens-group tube 109 can be moved for zooming as desired by the rotational drawing-out action of the cam tube 107.

A known electromagnetic diaphragm unit 110 is carried by the third-lens-group tube 109.

A fourth-lens-group tube 111 carries the fourth lens group IV. The fourth-lens-group tube 111 has three connection parts 111b on its peripheral part. The three connection parts 111b are secured to the fixed tube 101 through the cutout part 107k of the cam tube 107.

FIG. 14 is a diagram showing the movement of each lens group taking place at the time of zooming. In this instance, the first lens group I, the third lens group III and the fifth lens group V are drawn out in a nonlinear manner while the second lens group II and the fourth lens group IV remains stationary.

In the second embodiment, the operation ring is arranged to be movable in the direction of thrust. In a case where the operation ring is of a rotating type, the operation ring moves in the direction of circumference. In that case, the operating force can be corrected in the same manner as the embodiment by replacing the longitudinal grooves (outer rectilinear grooves 101a) of the second embodiment with circumferential grooves and by varying the groove width of the circumferential grooves. This modification, therefore, makes the contents and the spirit of this invention applicable also to a lens barrel of the rotational operation ring type.

Further, the correction of the operating force by means of the rectilinear or rotational grooves described in the foregoing may be replaced with use of a flange arranged to vary in part its thickness in the direction of rectilinear movement or rotation in combination with pressed contact members arranged to sandwich the flange between them. Such a modification falls within the spirit and scope of this invention.

In the embodiment described, an operation ring arranged to permit both a rectilinear operation and a rotational operation is divided into main and subordinate operation rings. The embodiment is arranged such that, with the subordinate operation ring operated relative to the main operation ring, the operating force varies little for the rotational operation and varies to a great extent for the rectilinear operation. Even in a case where an optical apparatus is relatively heavy, the arrangement gives an operating force adjustment mechanism which excels in operability for operations on one and the same ring in every direction relative to gravity.

Further, an optical apparatus which has a fixed part and an acting member and is arranged according to this invention as another embodiment thereof is provided with a protruding or recessed guide part which determines the operating direction of an operation member and an elastic sliding member which is arranged to be in pressed contact with the protruding or recessed part. The embodiment is arranged to make the pressed contact force of the elastic sliding member variable by partly varying the pressed contact part of the protruding or recessed part. This arrangement enables the optical apparatus to have an operating force adjustment mechanism which ensures excellent operability and gives an operating force apposite to each of different areas of operation.

What is claimed is:

1. An optical apparatus comprising:
   a main operation member;
   a subordinate operation member which moves unitedly with said main operation member when said main operation member is operated; and
   a mechanism for varying a force required for an operation of the main operation member in response to an operation of the subordinate operation member.

2. An apparatus according to claim 1, wherein a focal length of an optical system is changed by the operation of the main operation member.

3. An apparatus according to claim 1, wherein a focus of an optical system is changed by the operation of the main operation member.

4. An apparatus according to claim 1, wherein the main operation member moves linearly.

5. An apparatus according to claim 1, wherein the main operation member rotates.

6. An apparatus according to claim 1, wherein the optical apparatus is a lens barrel.

7. An optical apparatus comprising:
   a main operation member which moves linearly in the optical axis direction and rotates around the optical axis;
   a subordinate operation member; and
   a mechanism for varying a force required for an operation of the main operation member in response to an operation of the subordinate operation member, said mechanism being arranged to make an amount of change of force required for the rotation of the main operation member smaller than an amount of change of force required for the linear movement of the main operation member.

8. An optical apparatus according to claim 7, wherein the linear movement of the main operation member varies a focal length of an optical system and the rotation of the main operation member varies a focus of the optical system.

9. An optical apparatus according to claim 7, wherein the subordinate operation member moves relative to the main operation member to vary the force required by the operation of the main operation member.

10. An optical apparatus according to claim 9, wherein said subordinate operation member is in screwed connection with said main operation member, and wherein a frictional force occurring during the rectilinear operation of said main operation member is varied by a change of a relative position between said main operation member and said subordinate operation member in an axial direction resulting from the rotational operation of said subordinate operation member.

11. An optical apparatus according to claim 7, wherein the operating force is varied by operating said subordinate operation member to vary a frictional force occurring during the rectilinear operation of said main operation member.

12. An optical apparatus according to claim 7, wherein the optical apparatus is a lens barrel.

13. An apparatus according to claim 7, wherein said subordinate operation member moves unitedly with said main operation member when said main operation member is operated.

14. An optical apparatus, comprising:
    a movable main operation member which moves in the optical axis direction by operation; and
    a subordinate operation member for varying a force required for operating said main operation member.

15. An apparatus according to claim 14, wherein a focal length of an optical system is changed by the operation of the main operation member.

16. An apparatus according to claim 14, wherein a focus of an optical system is changed by the operation of the main operation member.

17. An apparatus according to claim 14, wherein said subordinate operation member moves unitedly with said main operation member when said main operation member is operated.

* * * * *